US006961793B2

United States Patent
Kato (10) Patent No.: US 6,961,793 B2
(45) Date of Patent: Nov. 1, 2005

(54) BUS ARBITER AND BUS ACCESS ARBITRATING METHOD

(75) Inventor: Tetsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 327 days.

(21) Appl. No.: 10/298,635

(22) Filed: Nov. 19, 2002

(65) Prior Publication Data

US 2003/0097505 A1 May 22, 2003

(30) Foreign Application Priority Data

Nov. 20, 2001 (JP) ........................................ 2001-354400

(51) Int. Cl.[7] .................. G06F 13/362; G06F 13/20
(52) U.S. Cl. ......................... 710/113; 710/241; 710/40
(58) Field of Search ...................... 710/40, 107, 113, 710/114, 116, 240, 241, 204

(56) References Cited

U.S. PATENT DOCUMENTS

| 5,926,628 | A | * | 7/1999 | Tran et al. ................. | 710/113 |
| 6,070,205 | A | * | 5/2000 | Kato et al. ................. | 710/100 |
| 6,073,199 | A | * | 6/2000 | Cohen et al. .............. | 710/113 |
| 6,092,137 | A | * | 7/2000 | Huang et al. .............. | 710/111 |
| 6,665,760 | B1 | * | 12/2003 | Dotson ........................ | 710/240 |
| 2003/0097505 | A1 | * | 5/2003 | Kato ........................... | 710/113 |

FOREIGN PATENT DOCUMENTS

| JP | 1-189750 | 7/1989 |
| JP | 02-170255 | 7/1990 |
| JP | 05-242021 | 9/1993 |
| JP | 05-274254 | 10/1993 |
| JP | 06-243093 | 9/1994 |
| JP | 07-249000 | 9/1995 |
| JP | 08-161257 | 6/1996 |
| JP | 10-228446 | 8/1998 |
| JP | 10-254823 | 9/1998 |
| JP | 2000-099455 | 4/2000 |

OTHER PUBLICATIONS

Japanese Office Action dated May 6, 2005 (with partial English translation).

* cited by examiner

Primary Examiner—Tim Vo
Assistant Examiner—Trisha Vu
(74) Attorney, Agent, or Firm—McGinn & Gibb, PLLC (57) ABSTRACT

A bus arbiter for a group of masters and a bus access control method. An arbitration priority control section output basic priority data for each of the masters. An arbitration priority generating section is provided for each of the masters, and combines the basic priority data for the corresponding master with request indication data indicating existence or non-existing of a bus access request from corresponding master to generate arbitration priority data. An arbitration priority comparing section compares the arbitration priority data for the masters with each other to determine the arbitration priority data which has the highest priority, and outputs a comparison resultant signal containing data for specifying the master corresponding to the arbitration priority data with the highest priority. An arbitration result notifying section outputs a bus use permission signal to the corresponding master with the highest priority in response to the comparison resultant signal.

20 Claims, 10 Drawing Sheets

BUS ARBITER AND BUS ACCESS ARBITRATING METHOD

BACKGROUND OF THE INVENTION

1. Field of the Invention

The present invention relates to a bus arbiter and a bus access arbitrating method.

2. Description of the Related Art

Conventionally, a processor is known in which a plurality of masters and a plurality of slaves are connected with a bus such as a CPU local bus and a PCI bus. In such a processor, when the masters generate bus access requests to the slaves at a same time, a competition of the bus accesses requests is caused. The processor is provided with a bus arbiter to avoid the competition of the bus access requests. The bus arbiter arbitrates the bus access requests from the plurality of masters and allocates a bus usage right to only one of the masters.

Figure 1:
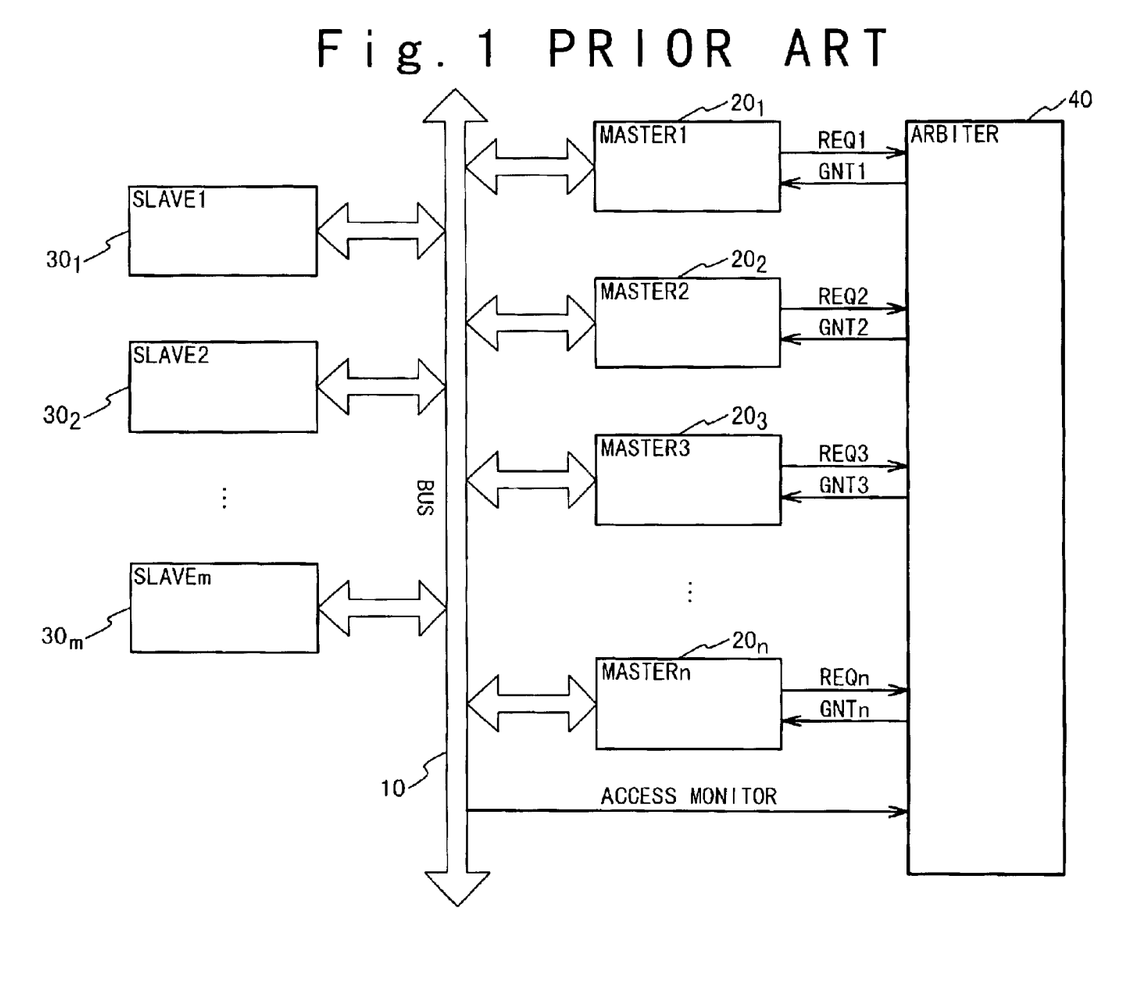
FIG. 1 is a block diagram showing the structure of a conventional bus arbiter.

Hereinafter, the conventional bus arbiter will be described. FIG. 1 is a block diagram showing the structure of the conventional processor to which the bus arbiter is applied.

Referring to FIG. 1, the processor is composed of a bus 10, a plurality of masters (MASTER1 to MASTERn) 201 to 20n which can access the bus 10 actively, a plurality of slaves (SLAVE1 to SLAVEm) 301 to 30m which receive the access passively, and a bus arbiter (ARBITER) 40. It should be noted that in case of a PCI local bus or Card Bus (Card Bus), the slave is called a target, too.

Generally, the masters 201 to 20n generate bus access requests asynchronously. The bus arbiter 40 arbitrates the competition of the bus access requests asynchronously generated. The masters 201 to 20n send the bus access requests REQ1 to REQn to the bus arbiter 40 to request the bus usage right. The bus arbiter 40 determines one of the masters for the bus usage right to be allocated in response to the bus access requests REQ1 to REQn and sends one of bus use permission signals GNT1 to GNTn corresponding to the master, to which the bus usage right is allocated, to permit the use of the bus 10.

Figure 2:
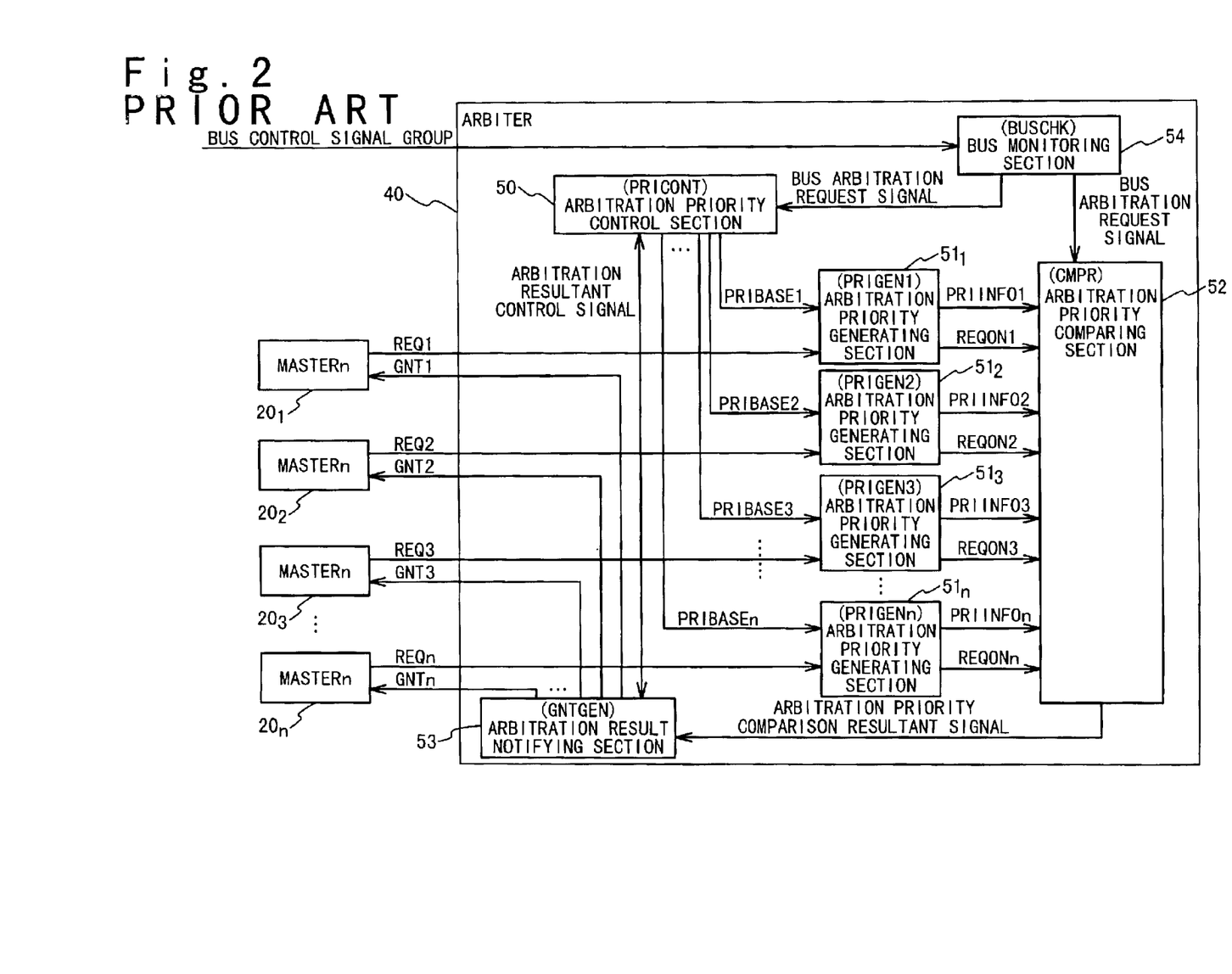
FIG. 2 is a block diagram showing the detailed structure of the bus arbiter shown in FIG. 1.

FIG. 2 is a block diagram showing the detailed structure of the bus arbiter 40. The bus arbiter 40 is composed of an arbitration priority control section (PRICONT) 50, a plurality of arbitration priority generating sections (PRIGEN1 to PRIGENn) 511 to 51n, an arbitration priority comparing section (CMPR) 52, an arbitration result notifying section (GNTGEN) 53, and a bus monitoring section (BUSCHK) 54.

When the bus access requests REQ1 to REQn are sent from the masters 201 to 20n to the bus arbiter 40, a bus access arbitration process is started. In the bus access arbitration process, the arbitration priority generating section PRIGENi 51i (i=1, 2, . . . , n, hereinafter, being same) receives the bus access request REQi, and generates arbitration priority data PRIINFOi based on basic priority data PRIBASEi which is sent as a basic priority from the arbitration priority control section 50. Also, the arbitration priority generating section PRIGENi 51i generates a request ON signal REQONi showing the existence or non-existence of the bus access request REQi from the master 20i. The arbitration priority data PRIINFOi and the request ON signal REQONi are sent to the arbitration priority comparing section 52.

The arbitration priority comparing section 52 compares the arbitration priority data to select the master with the highest arbitration priority from among the masters corresponding to the request ON signals. The arbitration priority comparing section 52 sends an arbitration priority comparison resultant signal to the arbitration result notifying section 53 based on the comparing result. The arbitration priority comparison resultant signal contains data to specify the selected master. The arbitration result notifying section 53 sends a bus usage permission signal GNTi to the selected master 20i shown by the arbitration priority comparison resultant signal.

The above-mentioned bus access arbitration process is carried out for every bus access, i.e., for every bus cycle. The bus monitoring section 54 monitors and detects the start and end of the bus cycle, and sends a bus arbitration control request signal to the arbitration priority control section 50 and the arbitration priority comparing section 52, to define the timing to permit the use of the bus 10 in the next bus cycle.

Also, the arbitration result notifying section 53 sends to the arbitration priority control section 50 an arbitration result reflection control signal generated based on the arbitration priority comparison resultant signal from the arbitration priority comparing section 52 to reflect an arbitration result. By this, the arbitration priority control section 50 can reflect the arbitration result to the generation of the next basic priority data PRIBASEi.

Figure 3:
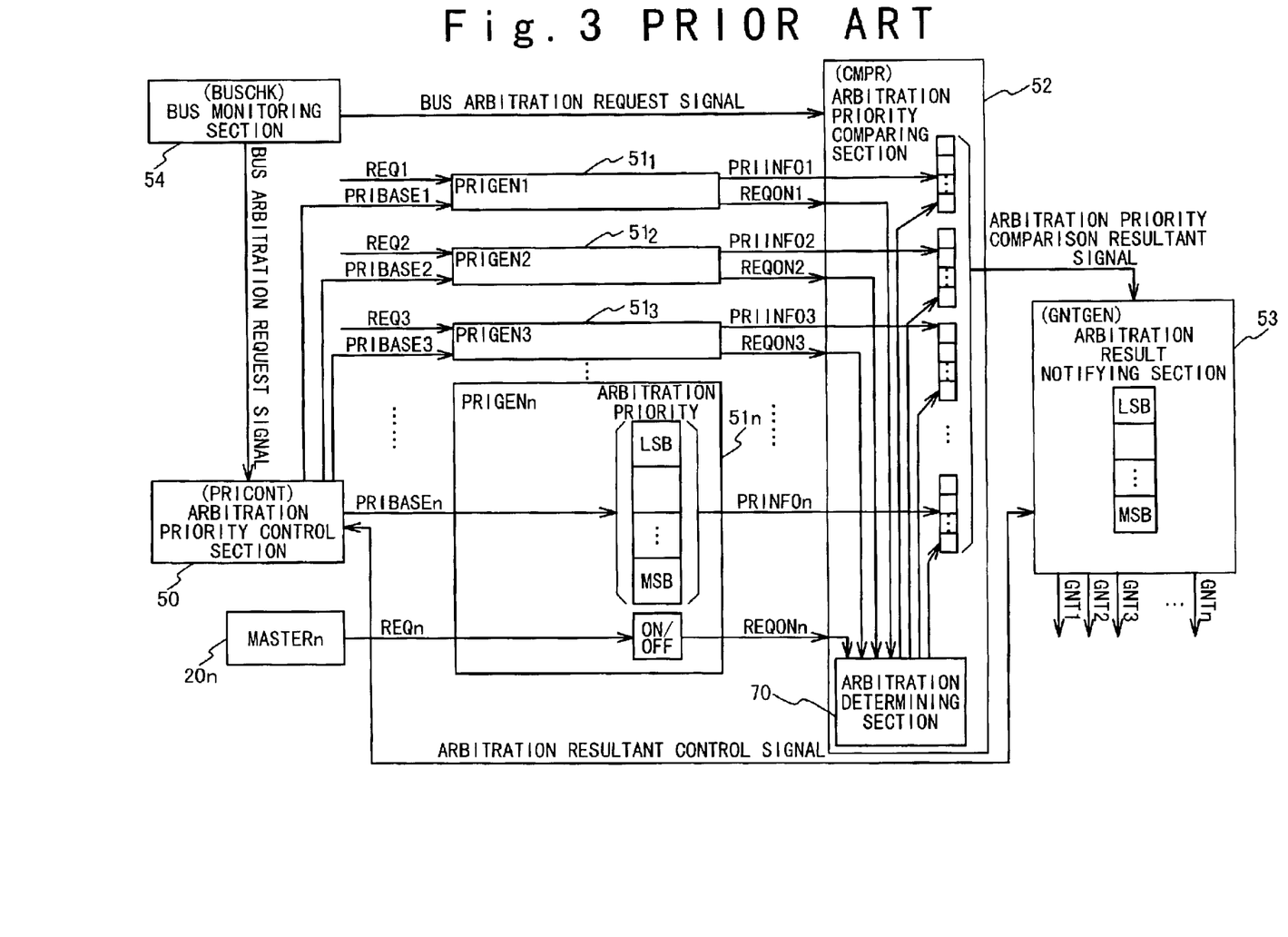
FIG. 3 is a block diagram showing an arbitration priority generating section, an arbitration priority comparing section and an arbitration result notifying section of FIG. 2 in detail.

FIG. 3 is a block diagram showing the arbitration priority generating section (PRIGENn) 51n, the arbitration priority comparing section (CMPR) 52 and arbitration result notifying section (GNTGEN) 53 in detail. It should be noted that each structure of the arbitration priority generating section (PRIGEN1 to PRIGENn-1) 511 to 51n-1 are omitted from FIG. 3. However, they have the same structure as that of the arbitration priority generating section (PRIGENn) 51n.

The arbitration priority generating section 51i generates the arbitration priority data PRIINFOi based on the basic priority data PRIBASEi from the arbitration priority control section 50, and the arbitration priority data PRIINFOi contains a plurality of bits showing a priority. Also, the arbitration priority generating section 51i generates the request ON signal REQONi based on the bus access request REQi to show the existence or non-existence of the bus access request. The arbitration priority data PRIINFOi and the request ON signal REQONi are sent to the arbitration priority comparing section 52 as different parameters.

The arbitration priority comparing section 52 is composed of an arbitration object determining section 70. The arbitration object determining section 70 determines as comparison objects, only the arbitration priority data corresponding to the request ON signals and outputted from the arbitration priority generating sections. The arbitration priority comparing section 52 selects the highest one of the arbitration priority data determined as the comparison objects by the arbitration object determining section 70, and sends the arbitration priority comparison resultant signal to the arbitration result notifying section 53. The arbitration result notifying section 53 generates and sends the bus usage permission signal to the master with the highest priority based on the arbitration priority comparison resultant signal to permit the bus use. Thus, the bus access arbitration process completes.

As mentioned above, in the conventional bus arbiter, when the bus access requests are generated, the request ON signals are sent to the arbitration priority comparing section in addition to the arbitration priorities, to show the existence or non-existence of a bus access request. The arbitration priority comparing section 52 includes the arbitration object determining section 70, and determines whether each bus access request is the object of the arbitration, based on the request ON signal by the arbitration object determining section 70. Therefore, the arbitration priority comparing section 52 becomes larger in the hardware structure. As a result, the bus arbiter becomes expensive.

In conjunction with the above description, a bus control apparatus is disclosed in Japanese Laid Open Patent Application (JP-A-Heisei 2-170255). In the bus control apparatus of this conventional example, a plurality of processors are connected with a bus. A selector selects one of the plurality of processors. A priority determining section determines priorities of the processors dynamically based on the statuses of them.

Also, a bus arbiter is disclosed in Japanese Laid Open Patent Application (JP-A-Heisei 5-242021). In the bus arbitration circuit of this conventional example, the priority of each of a plurality of masters to the bus usage right is stored in a priority storage circuit. A priority comparing circuit compares the priorities stored in the priority storage circuit to determine the current priority order of the masters to bus usage right. A bus use permission signal is outputted to one of the masters, which has the highest priority of the current priority order, by the priority comparing circuit in response to bus use requests. A priority control circuit carries out a priority control to increase the priorities stored in the priority storage circuit and corresponding to the masters other than the master with the highest priority. Also, the priority of the master with the highest priority is decreased. By the structure, it is possible to equally allocate the bus usage right to masters without limiting the reception of the bus use requests. Also, it is possible to allocate the bus usage right to the masters with high priority levels and the masters with low priority levels while keeping a constant rate.

Also, a bus arbiter circuit is disclosed in Japanese Laid Open Patent Application (JP-A-Heisei 5-274254). In the bus arbiter circuit of this conventional example, a bus use permission signal generating section receives a bus use request from a plurality of masters and allocates a bus use permission signal to a master with the highest priority. A bus use priority updating section reduces the priority of the master with the bus use permission signal to the lowest. Thus, the priorities of the masters with the priorities lower than the master supplied with the bus use permission signal are made higher by one. As a result, the bus use permission can be given to the plurality of masters equally.

Also, a bus control system is disclosed in Japanese Laid Open Patent Application (JP-A-Heisei 6-243093). In the bus control system for a serial bus of this conventional example, a plurality of bus masters are connected with a bus. Each bus master is composed of a bus request priority setting section which sets priority of a bus request variably, and a priority sending section which sends priority data indicative of the priority onto the bus. A priority receiving section receives the priority data from the bus masters. A bus arbiter permits the bus requests to the bus masters in accordance with a higher order of the priorities received by the priority receiving section.

Also, a method of determining a circulating-type bus priority is disclosed in Japanese Laid Open Patent Application (JP-A-Heisei 7-249000). In the bus arbitration method for a serial bus of this conventional example, when a plurality of ports connected with the serial bus tries to acquire the bus, one of the plurality of ports is selected, and the bus is allocated to the selected port. That is, when transmission requests are outputted from the plurality of ports to the bus, one of the plurality of ports having the largest port identification number is selected to acquire the bus, and the port identification number of the port having acquired the bus is made smaller than the port identification numbers of the other ports.

Also, a common bus usage right control system is disclosed in Japanese Laid Open Patent Application (JP-A-Heisei 8-161257). In the common bus usage right control system of this conventional example, a plurality of bus masters are connected with a common bus. An allocating section allocates a priority level to each of use requests of the common bus from the plurality of bus masters in accordance with an external instruction. An arbitration section arbitrates the use requests to the common bus in accordance with the priority levels. A connection section is provided to connect the plurality of bus masters in series such that a bus use permission signal is propagated between ones of the plurality of bus masters to which the same priority level is allocated.

Also, a bus arbitration system is disclosed in Japanese Laid Open Patent Application (JP-A-Heisei 10-228446). The bus arbitration system of this conventional example is composed of a bus arbitration circuit to arbitrate accesses to a bus from a plurality of bus masters. Each bus the master has a function to output a bus use request, a function to wait the bus access until a bus use permission signal is received, and a function to send out an address to the bus. The bus arbitration circuit is composed of a priority data storage section for storing a plurality of sets of bus master priority data, and each set of bus master priority data shows priorities of the bus masters. A priority data selecting section selects one of the plurality of sets one by one for every bus cycle. A bus use permission signal generating circuit outputs a bus use permission signal to one with the highest priority of the bus masters which have generated bus use requests in accordance with the selected set of bus master priority data, to permit the use of the bus during only one bus cycle bus.

Also, a bus arbitration apparatus is disclosed in Japanese Laid Open Patent Application (JP-A-Heisei 10-254823). In this conventional example, a plurality of devices are connected to a bus. The bus arbitration apparatus arbitrates the bus use requests when the bus use requests are outputted from the plurality of devices and compete to each other. The bus arbitration apparatus stores variable weight values which are different between the devices and are changed for every bus arbitration. The variable weight values are used as the priorities of the devices.

Also, a first arrival priority bus competition control system is disclosed in Japanese Laid Open Patent Application (JP-P2000-99455A). In this conventional example, a plurality of input/output processors are connected to a bus. A first arrival fixed priority arbitration section selects one of bus use request signals in accordance with the arrival order in units of clocks. A change detecting section detects the change of the priority output from the arbitration section. A priority storage section stores the priority output from the change detecting section until the bus use end. A bus use permission signal synchronization section outputs the bus use permission signal. An arbitration control unit controls the bus use permission signal synchronization section based on the output state of the bus use permission signal.

SUMMARY OF THE INVENTION

Therefore, an object of the present invention is to provide a bus arbiter and a method of bus access arbitration, in which it is possible to arbitrate bus access requests with the simple structure.

In an aspect of the present invention, a bus arbiter for a plurality of masters which issue bus access requests, includes an arbitration priority control section arbitration priority generating sections, an arbitration priority comparing section and an arbitration result notifying section. The arbitration priority control section outputs basic priority data for each of the plurality of masters. Each of the arbitration priority generating sections is provided for a corresponding one of the plurality of masters, and combines the basic priority data for the corresponding master and request indication data indicating existence or non-existence of the bus access request from the corresponding master to generate arbitration priority data. The arbitration priority comparing section compares a plurality of the arbitration priority data for the plurality of masters with each other to determine one of the plurality of arbitration priority data which has the highest priority, and outputs a comparison resultant signal containing data for specifying one of the plurality of masters corresponding to the arbitration priority data with the highest priority. The arbitration result notifying section outputs a bus use permission signal to the corresponding master with the highest priority in response to the comparison resultant signal.

Each of the arbitration priority generating sections combines the request indication data for the corresponding master to the basic priority data for the corresponding master as the most significant bit to generate the arbitration priority data as binary data. In this case, the arbitration priority comparing section compares a plurality of the binary arbitration priority data for the plurality of masters with each other to determine one of the plurality of arbitration priority data which has the highest priority.

Here, when a greater basic priority data indicates a higher priority, the request indication data may be 1 in case of existence of the bus access request from the corresponding master and 0 in case of non-existence of the bus access request from the corresponding master.

Also, when a smaller basic priority data indicates a higher priority, the request indication data may be 0 in case of existence of the bus access request from the corresponding master and 1 in case of non-existence of the bus access request from the corresponding master.

Also, the bus arbiter may further include a monitoring section which monitors a status of a bus to determine whether a new bus cycle can be started. Each of the arbitration priority generating sections generates the arbitration priority data for the corresponding master when it is determined that the new bus cycle cannot be started, and the bus access request from the corresponding master is changed. Also, each of the arbitration priority generating sections may hold the arbitration priority data for the corresponding master when it is determined that the new bus cycle cannot be started, but the bus access request from the corresponding master is not changed.

Also, the arbitration result notifying section outputs an arbitration resultant control signal to the arbitration priority control section in response to the comparison resultant signal. The arbitration priority control section changes the basic priority data for each of the plurality of masters based on the arbitration resultant control signal.

In this case, the arbitration priority control section may generate the basic priority data for each of the plurality of masters such that the basic priority data is circulated from a predetermined priority based a defined method.

Also, the arbitration priority control section may generate the basic priority data for at least a part of the plurality of masters such that the lowest priority is allocated to the master having received the bus use permission signal in a previous cycle and increased basic priority data is allocated to each of the plurality of masters other than the master having received the bus use permission signal.

Also, the arbitration priority control section may generate the basic priority data for at least a part of the plurality of masters such that fixed basic priority data are always allocated to each of the plurality of masters and the fixed basic priority data is allocated to the master having received the bus use permission signal in a previous cycle.

In another aspect of the present invention, a bus access control method for a plurality of masters which issue bus access requests, may be achieved by (a) generating basic priority data for each of the plurality of masters; by (b) combining the basic priority data for the corresponding master and request indication data indicating existence or non-existence of the bus access request from the corresponding master to generate arbitration priority data; by (c) comparing a plurality of the arbitration priority data for the plurality of masters with each other to determine one of the plurality of arbitration priority data which has the highest priority; and by (d) allocating a bus usage right to the corresponding master with the highest priority.

Here, the (b) combining step may be achieved by combining the request indication data for the corresponding master to the basic priority data for the corresponding master as the most significant bit to generate the arbitration priority data as binary data.

In this case, when a greater basic priority data indicates a higher priority, the request indication data may be 1 in case of existence of the bus access request from the corresponding master and 0 in case of non-existence of the bus access request from the corresponding master.

Also, the bus access control method may further include monitoring a status of a bus to determine whether a new bus cycle can be started. The (b) combining step may be achieved by generating the arbitration priority data for the corresponding master when it is determined that the new bus cycle cannot be started, and the bus access request from the corresponding master is changed.

Also, the (a) generating step may be achieved by changing the basic priority data for each of the plurality of masters based on the allocation of the bus usage right to the corresponding master with the highest priority.

DESCRIPTION OF THE PREFERRED EMBODIMENTS

Hereinafter, a bus arbiter and a method of bus access arbitration according to the present invention will be described in detail with reference to the attached drawings.

The processor to which the bus arbiter of the present invention is applied has the same structure as that shown in FIG. 1.

Figure 4:
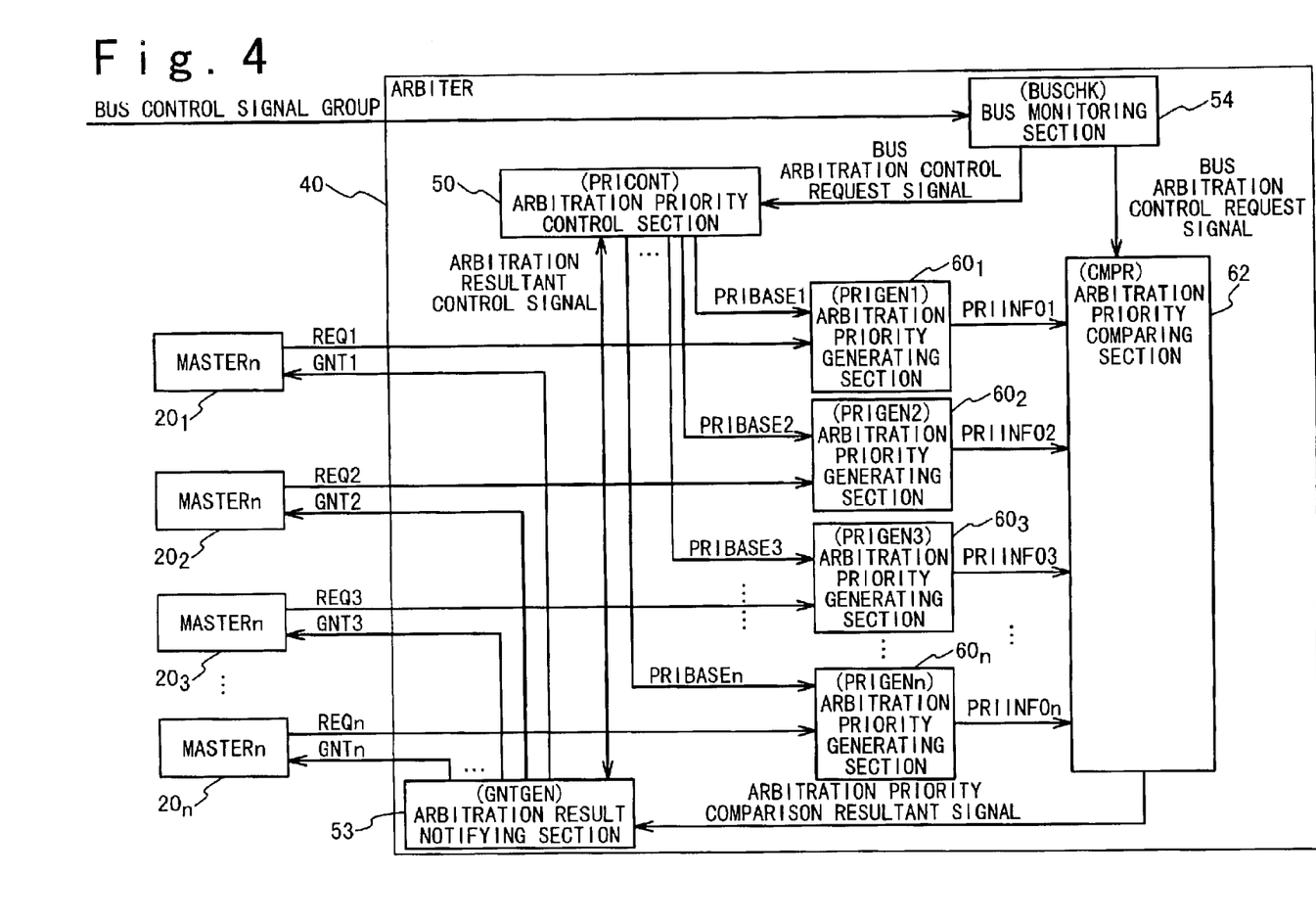
FIG. 4 is a block diagram showing the structure of a bus arbiter according to a first embodiment of the present invention.

FIG. 4 is a block diagram showing the detailed structure of the bus arbiter 40 according to the first embodiment of the present invention. Referring to FIG. 4, the bus arbiter 40 is composed of an arbitration priority control section (PRICONT) 50, a plurality of arbitration priority generating sections (PRIGEN1 to PRIGENn) 601 to 60n, an arbitration priority comparing section (CMPR) 62, an arbitration result notifying section (GNTGEN) 53, and a bus monitoring section (BUSCHK) 54.

When bus access requests REQ1 to REQn are sent from the masters 201 to 20n to the bus arbiter 40, a bus access arbitration process is started. In the bus access arbitration process, the arbitration priority generating section 60$i$ receives bus access requests REQ$i$ (i=1, 2, ..., n, to be same hereinafter) and generates the arbitration priority data PRIINFO$i$ based on the basic priority data PRIBASE$i$, which has been sent from the arbitration priority control section 50, and the bus access request REQ$i$ from the master 20$i$. The arbitration priority generating section 60$i$ sends it to the arbitration priority comparing section 62. The arbitration priority comparing section 62 compares the plurality of the arbitration priority data PRIINFO1 to PRIINFOn sent from the plurality of the arbitration priority generating section 601 to 60n with each other. Then, the arbitration priority comparing section 62 selects the master with the highest arbitration priority based on the comparison result and sends an arbitration priority comparison resultant signal showing the comparison result to the arbitration result notifying section 53. The arbitration priority comparison resultant signal contains data to specify the master with the highest arbitration priority. The arbitration result notifying section 53 sends a bus use permission signal GNT$i$ to the master 20$i$ selected based on the arbitration priority comparison resultant signal.

The above-mentioned bus access arbitration process is carried out for every bus access unit, i.e., for every bus cycle. The bus monitoring section 54 monitors and detects the start and end of the bus cycle and sends the bus arbitration control request signal to the arbitration priority control section 50 and the arbitration priority comparing section 62 to define the timing to permit the use of the bus 10 in the next bus cycle.

Also, the arbitration result notifying section 53 sends an arbitration result reflection control signal to the arbitration priority control section 50 based on the arbitration priority comparison resultant signal to reflect the arbitration result. By this, it is possible to avoid the state that the bus use centers on a specific master. In the bus access arbitration for next time, the bus usage right may be allocated to any of the masters which does not use the bus in immediately previous cycle. Also, oppositely, it is possible to continue to allocate the bus usage right to one of the masters. Moreover, one master as default can be allocated the bus usage right when there is no bus access request from the masters. In this case, when the default master requests the bus access, the time period from when a bus access request is outputted to when the bus usage right is allocated can be reduced. Therefore, it is possible to improve the performance.

Figure 5:
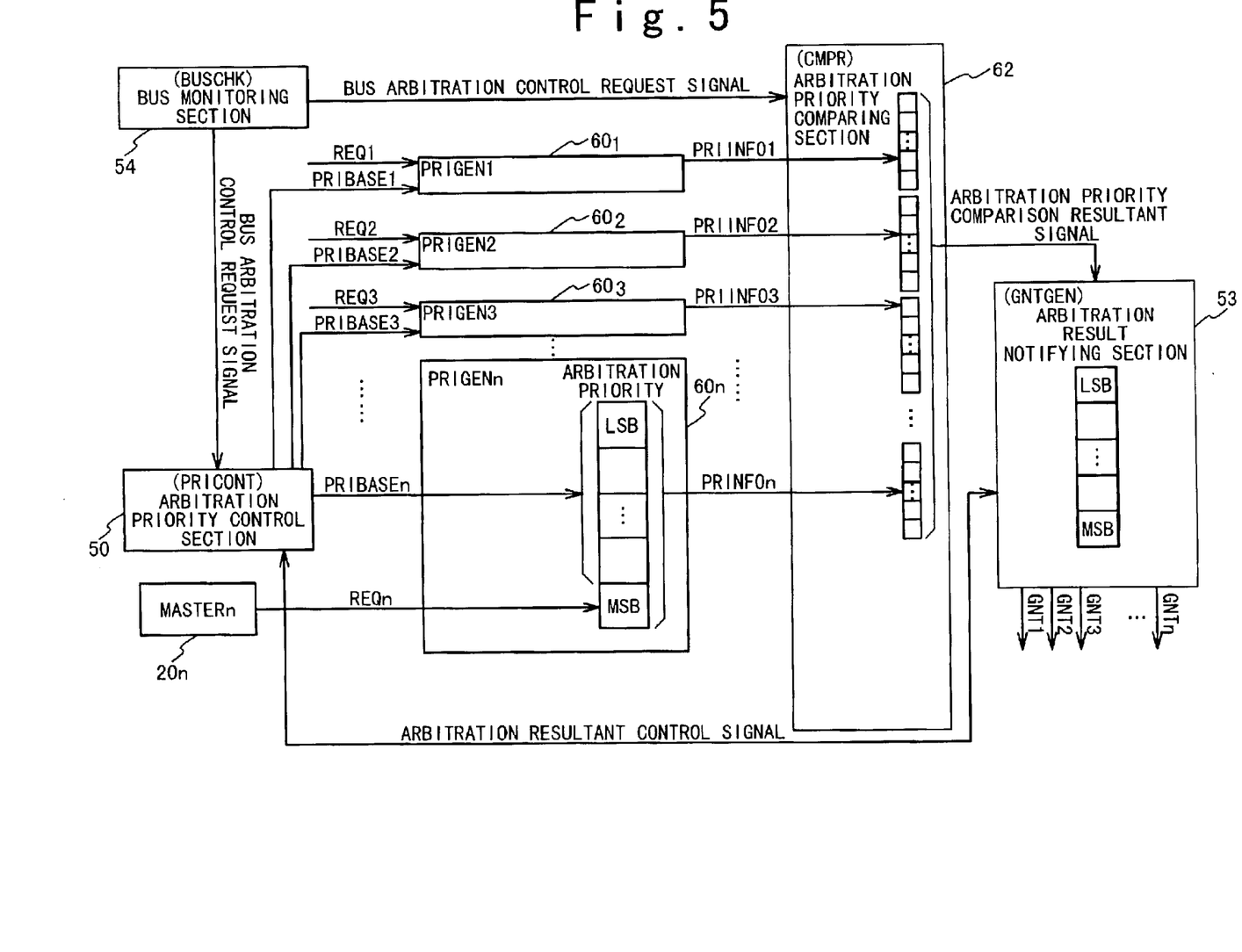
FIG. 5 is a block diagram showing an arbitration priority generating section, an arbitration priority comparing section and an arbitration result notifying section in the bus arbiter according to the first embodiment of the present invention in detail.

FIG. 5 is a block diagram showing the arbitration priority generating section (PRIGENn) 60n, arbitration priority comparing section (CMPR) 62 and arbitration result notifying section (GNTGEN) 53 in detail. It should be noted that the structure of each of the arbitration priority generating section (PRIGEN1 to PRIGENn-1) 601 to 60n-1 is omitted at FIG. 5. However, it is the same as that of the arbitration priority generating section (PRIGENn) 60n.

The arbitration priority generating section 60$i$ generates arbitration priority data PRIINFO$i$ of the basic priority data PRIBASE$i$ on the side of the LSB (Least Significant Bit) side and bus access request REQ$i$ on the side of the MSB (Most Significant Bit), and sends to the arbitration priority comparing section 62. The larger basic priority data PRIBASE$i$ shows the higher priority in the arbitration, and the bus access request REQ$i$ indicates "0" in case of no access request and "1" in case of the access request. Because the bus access request REQ$i$ is located on the MSB side of the arbitration priority data PRIINFO$i$, the arbitration priority data is a binary data and becomes the larger binary data in the case of the bus access request REQ$i$ of "1" than in the case of the bus access request REQ$i$ of "0".

The arbitration priority comparing section 62 compares the plurality of the arbitration priority data PRIINFO1 to PRIINFOn from the plurality of the arbitration priority generating sections 601 to 60n simply, and selects the master with the highest arbitration priority. The arbitration priority comparing section 62 sends the arbitration priority comparison resultant signal to the arbitration result notifying section 53 to indicate the selected master.

Figure 6:
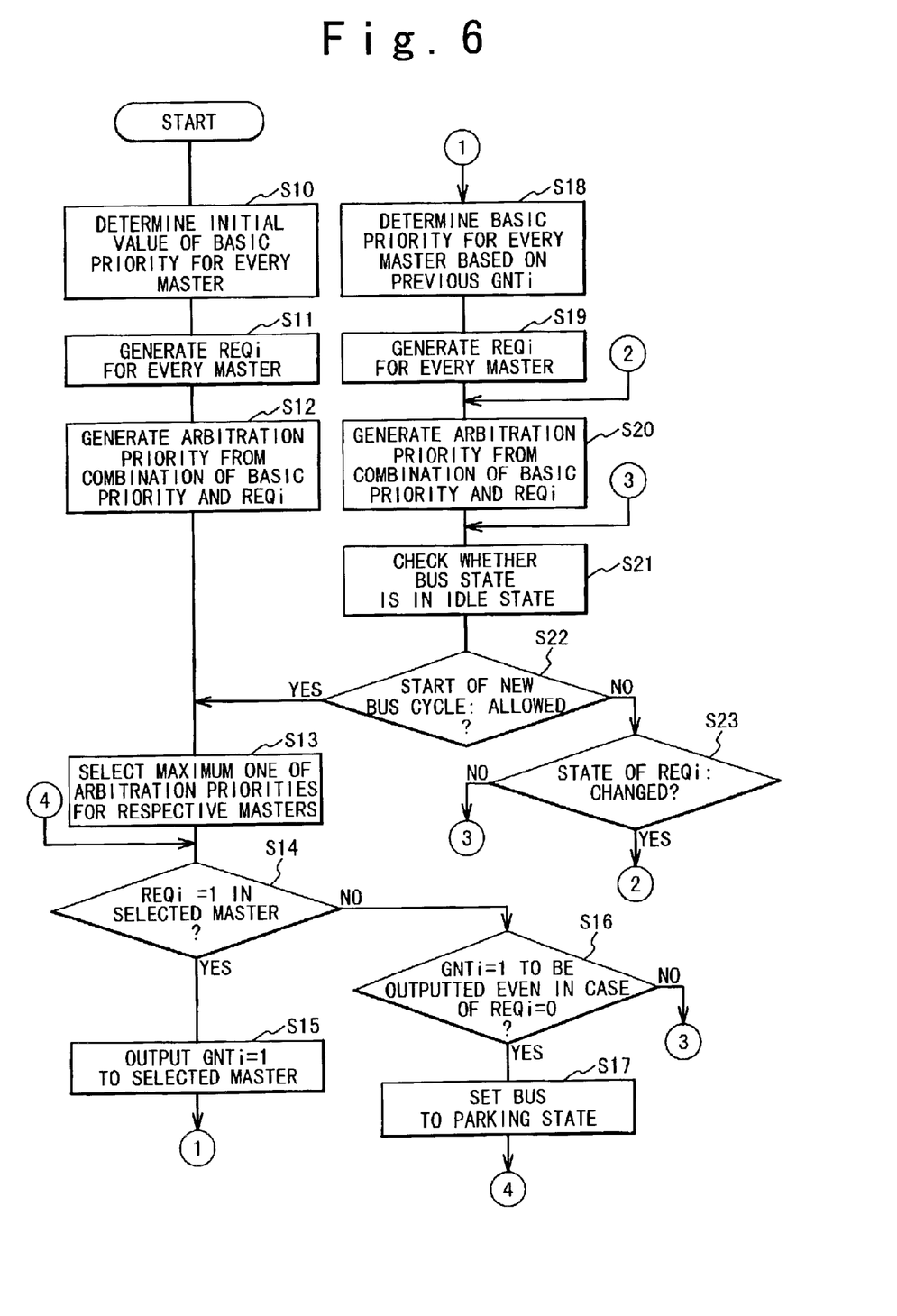
FIG. 6 is a flow chart showing the operation of the bus arbiter according to the first embodiment of the present invention.

Next, the operation of the bus arbitration process carried out by the bus arbiter with the above structure will be described with reference to FIG. 6.

In the bus arbitration process, the arbitration priority control section 50 sends the initial values as the basic priority data PRIBASE1 to PRIBASEn for the respective masters (Step S10). In the state, the masters 201 to 20n generate bus access requests. Thus, the bus access request REQ$i$ is generated from every master (Step S11). It should be noted that in the flow chart shown in FIG. 6, the bus access request REQ$i$ is supposed to be temporarily generated at the step S11. However, actually, it is randomly generated at an optional timing.

Next, the arbitration priority generating section 60$i$ combines the basic priority data PRIBASE$i$ from the arbitration priority control section 50 and request indication data showing the existence or non-existence of the bus access request REQ$i$ from the master 20$i$, and generates the arbitration priority data PRIINFO$i$ (Step S12). In this case, the basic priority data PRIBASE$i$ is located on the side of the LSB and the request indication data is located on the side of the MSB.

The request indication data and the basic priority data PRIBASEi are combined in the above manner. Thus, the arbitration priority data PRIINFOi is generated for every master.

Next, the arbitration priority comparing section 62 selects the arbitration priority data with the highest value from among the arbitration priority data for the plurality of the masters (Step S13). The request indication data is incorporated into the corresponding arbitration priority data. Therefore, the selecting process can be carried out by a simple comparison.

Next, whether the request indication data REQi from the master corresponding to the selected arbitration priority data is "1" is checked (Step S14) When it is determined to be "1", the arbitration priority comparing section 62 generates and sends the arbitration priority comparison resultant signal showing the selected master corresponding to the selected arbitration priority data to the arbitration result notifying section 53.

The arbitration result notifying section 53 sends a bus use permission signal GNTi to the selected master shown by the received arbitration priority comparison resultant signal (Step S15).

Next, the arbitration result notifying section 53 sends an arbitration result reflection control signal to the arbitration priority control section 50 (Step S18). In this way, the arbitration priority control section 50 determines the basic priority for every master for the next bus arbitration to reflect the bus use permission signal GNTi, i.e., the comparing result in the previous cycle.

Next, the masters 20l to 20n generate the bus access request. (Step S19). It should be noted that in the operation flow shown by the flow chart of FIG. 6, the bus access request REQi is supposed to be temporarily generated at the step S19. However, actually, it is randomly generated in an optional timing.

Next, the arbitration priority generating section 60i combines the basic priority data PRIBASEi from the arbitration priority control section 50 and the request indication data showing the bus access request REQi from the master 20i, and generates the arbitration priority data PRIINFOi (Step S20). The process of the step S20 is the same as that of the above-mentioned step S12.

Next, the bus monitoring section 54 checks whether or not the bus is an idle state to start the next bus cycle (Step S21). Then, whether or not it is possible to start a new bus cycle is checked (Step S22). When it is determined that the new bus cycle can be started, the operation flow branches to the step S13 and the above-mentioned operation is repeated.

On the other hand, when it is determined at the step S22 that the new bus cycle cannot be started, whether or not the state of the bus access request REQi has changed is checked (Step S23). If it is determined that the state of the bus access request REQi is changed, the operation flow returns to step S20 to generate the arbitration priority data once again. On the other hand, when it is determined that the state of bus access request REQi is not changed, the operation flow returns to the step S21 to check whether or not the bus is an idle state. Thus, the steps S21 to S23 are looped.

When it is determined at the above step S14 that the request indication data for the master corresponding to the selected arbitration priority data is not "1", the bus arbiter checks whether or not is the bus arbiter should output the bus use permission signal GNTi even if the bus access request REQi is "0" (Step S16). When it is determined YES, the operation flow enters a bus parking state (Step S17). Here, in the bus parking state, the bus use permission signal GNTi is outputted to the corresponding master even if the bus access request REQi is "0". After that, the operation flow returns to the step S14 and repeats an above-mentioned operation.

As described above, according to the bus arbiter according to the first embodiment of the present invention, the request indication data is incorporated into the arbitration priority data PRIINFOi, and a bus access request process and a priority comparison process are carried out at a time. Therefore, it is not necessary to check whether or not the master is an arbitration object, unlike the conventional bus arbiter. As a result, the arbitration object determining section provided for the arbitration priority comparing section of the conventional bus arbiter is unnecessary, and the structure to the bus arbiter can be simplified.

Next, the operation of the bus arbiter according to the first embodiment of the present invention will be described in detail. First, a common operation of the operations will be described.

When one master acquires the bus usage right and starts a bus access, the basic priority data PRIBASEi is changed for the next bus access arbitration.

The comparing timings of the arbitration priority data in the arbitration priority comparing section 62 are:

(a) a timing when one master issues a bus access request in the bus idle state in which there is no bus access request from the masters, i.e., when the arbitration priority data changes, (b) a timing immediately after an arbitration result is accepted by a system for the processor, in other words, when it is found that one master make use of the bus usage right to start the bus access, and (c) a timing when the bus access arbitration is required on the system separately.

However, it is supposed that there no comparing timing of the arbitration priority data during a time period from when one master acquires the bus usage right to when the bus access is actually carried out. A compulsive canceling section of the bus usage right due to a time-out event may be provided in the system, if necessary.

Hereinafter, it is supposed that there are eight masters 1 to 8 as the bus access request sources and each master is expressed in 3 bits. Also, it is supposed that the basic priority data is expressed in 3 bits and there are not same basic priority data at the same time. The binary arbitration priority data is expressed in 4 bits in which one bit data is added on the MSB side of the basic priority data to indicate the request indication data showing the existence or non-existence of the bus access request. By adding the request indication data of one bit to the MSB side, the arbitration priority data is coincident with the basic priority generally. However, when the bus access request REQi is issued from one master, the arbitration priority data changes into data obtained by adding "8" to the basic priority data. That is, the MSB of the arbitration priority data becomes "1".

Hereinafter, examples of the operation of the arbitration priority control section will be described.

(1) Basic Priority Circulating System

Figure 7:
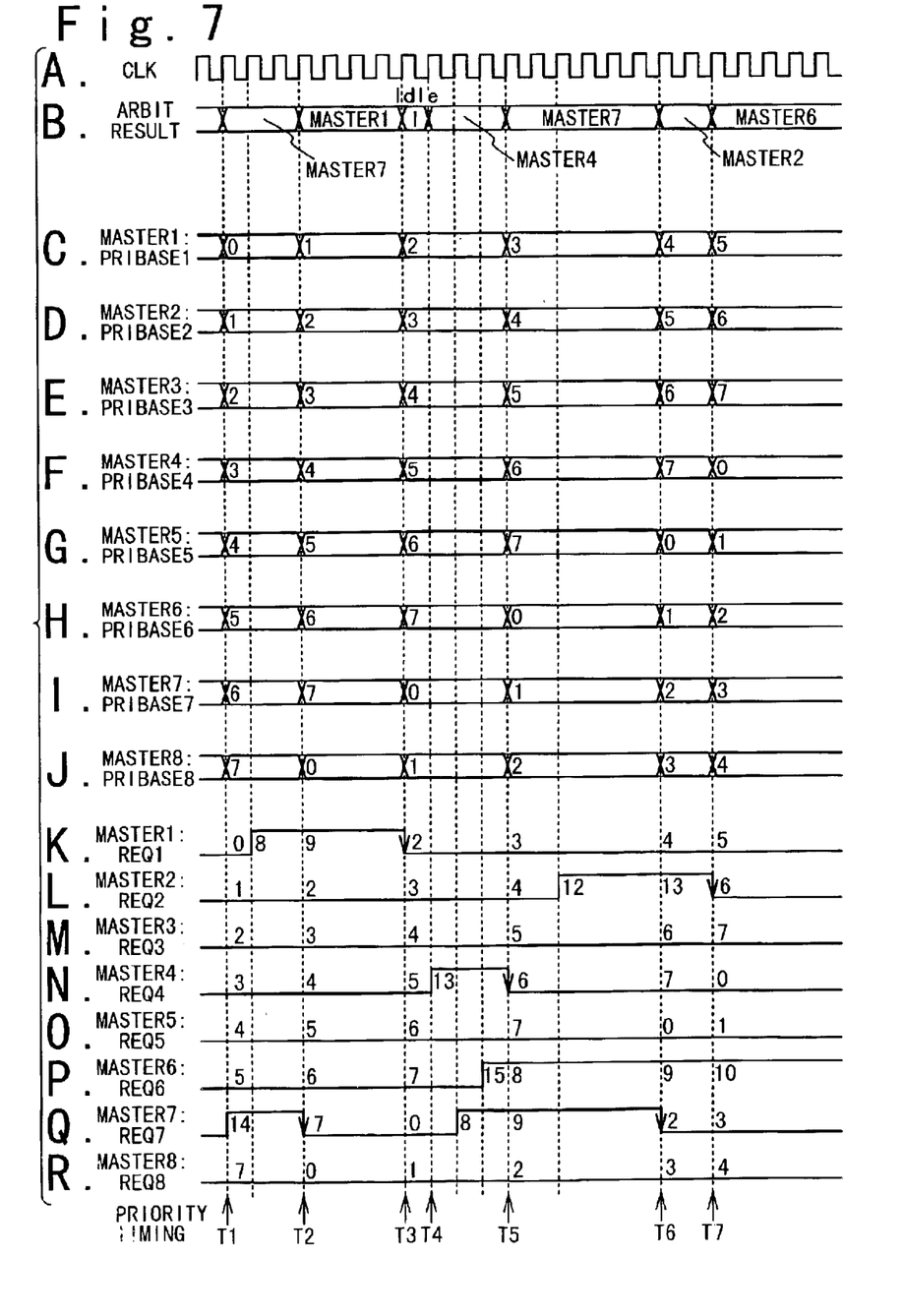
FIG. 7 is a timing chart showing an example of the operation of the bus arbiter according to the first embodiment of the present invention, when a basic priority circulating method is adopted.

First, the operation in "the basic priority circulating system" in which the basic priority data is circulated in accordance with a defined method will be described with reference to the timing chart of FIG. 7 as an example.

In case of the bus arbiter using the basic priority circulating system, as shown in FIGS. 7C to 7J, the basic priority data of each master is incremented by one for every comparing timing, and after the basic priority data reaches "7" as the highest basic priority data, it returns to "0" as the minimum basic priority data.

At the first comparing timing T1, as shown in FIGS. 7C to 7J, the basis priority data 0 to 7 are given to the masters 1 to 8, respectively. Moreover, it is supposed that the bus access request REQ7 of the master 7 exists as shown in FIGS. 7K to 7R. In this case, the arbitration priority data PRIINFO7 corresponding to the master 7 is "14" and is the highest. Therefore, the arbitration result is achieved to allocate the bus usage right to the master 7, as shown in FIG. 7B.

Next, as shown in FIGS. 7K to 7R, when the bus access request REQ1 is issued from the master 1 after a little time period from the first comparing timing T1, the arbitration priority data PRIINFO1 becomes "8". Because each basic priority data is incremented at the next comparing timing, the arbitration priority data PRIINFO1 becomes "9" at the next comparing timing T2. On the other hand, the arbitration priority data PRIINFO7 corresponding to the master 7 is changed to "7". This could be considered as follows. The basic priority data is returned to "6" at the comparing timing T2, and then incremented to "7". Therefore, the arbitration priority data PRIINFO1 corresponding to the master 1 is the highest in the next comparing timing T2. Therefore, the arbitration result is accomplished to allocate the bus usage right to the master 1, as shown in FIG. 7B. Hereinafter, the arbitration operation progresses in the same way in the operation flow.

According to the basic priority circulating system, the priority becomes gradually large until the basic priority becomes "7". Therefore, when the bus usage right is continuously acquired on the way where the priority becomes larger, there is a high possibility to acquire the bus usage right continuously. On the other hand, after the basic priority returns to "0", there is a low possibility to acquire the bus usage right continuously. In case of the basic priority circulating system, the bus access request sources can have the same priority statistically in a long term irrespective of the frequency of the access requests.

The bus arbiter using the basic priority circulating system may be modified such that the high basic priority and the low basic priority are alternatively outputted. For example, the basic priority may be outputted in such a manner as "0→4→1→5→2→6→3→7→0→4→1 . . . " or "0→4→2→6→1→5→3→7→0→4→2 . . . ".

It should be noted that in the basic priority circulating system, the bus usage right may be previously allocated to one of the masters in the idle state in which the bus access request is not issued from masters. Thus, it is possible to check whether the bus access request is not issued from masters, only by referring to the MSB of the arbitration priority comparison resultant signal notified to the arbitration result notifying section 53.

Comparing the conventional bus arbiter and the bus arbiter according to the embodiment, the bus access request REQi is not contained in the arbitration priority data in the conventional bus arbiter. Therefore, the request ON signal REQONi needs to be provided to show the existence or non-existence of the bus access request separately from the bus access request. By referring to the request ON signal at the time of the determination of the existence or non-existence of the bus access request in the acquisition of the bus usage right, i.e., in the comparison of the arbitration priority data, the arbitration object determining section 70 needs to be provided for the arbitration priority comparing section 62 in the conventional bus arbiter to check whether or not it is the arbitration object.

On the other hand, according to the bus arbiter according to the first embodiment, the bus access request REQi is a part of the arbitration priority data. Therefore, the bus access arbitration can be implemented only by carrying out the simple comparison of the arbitration priority data without providing a special function like the conventional arbitration object determining section 70. As a result, the reduction in costs and the circuit scale can be achieved.

(2) The Oldest Bus Acquiring Master Priority System

The bus arbiter adopts "the oldest bus acquiring master priority system" in which a minimum basic priority data is allocated to the master having acquired the bus usage right immediately before in the next priority comparison timing. In the oldest bus acquiring master priority system, supposing that the basic priority data of the master having acquired the bus usage right is a p, the basic priority data less than p are incremented by one, if p>0.

Figure 8:
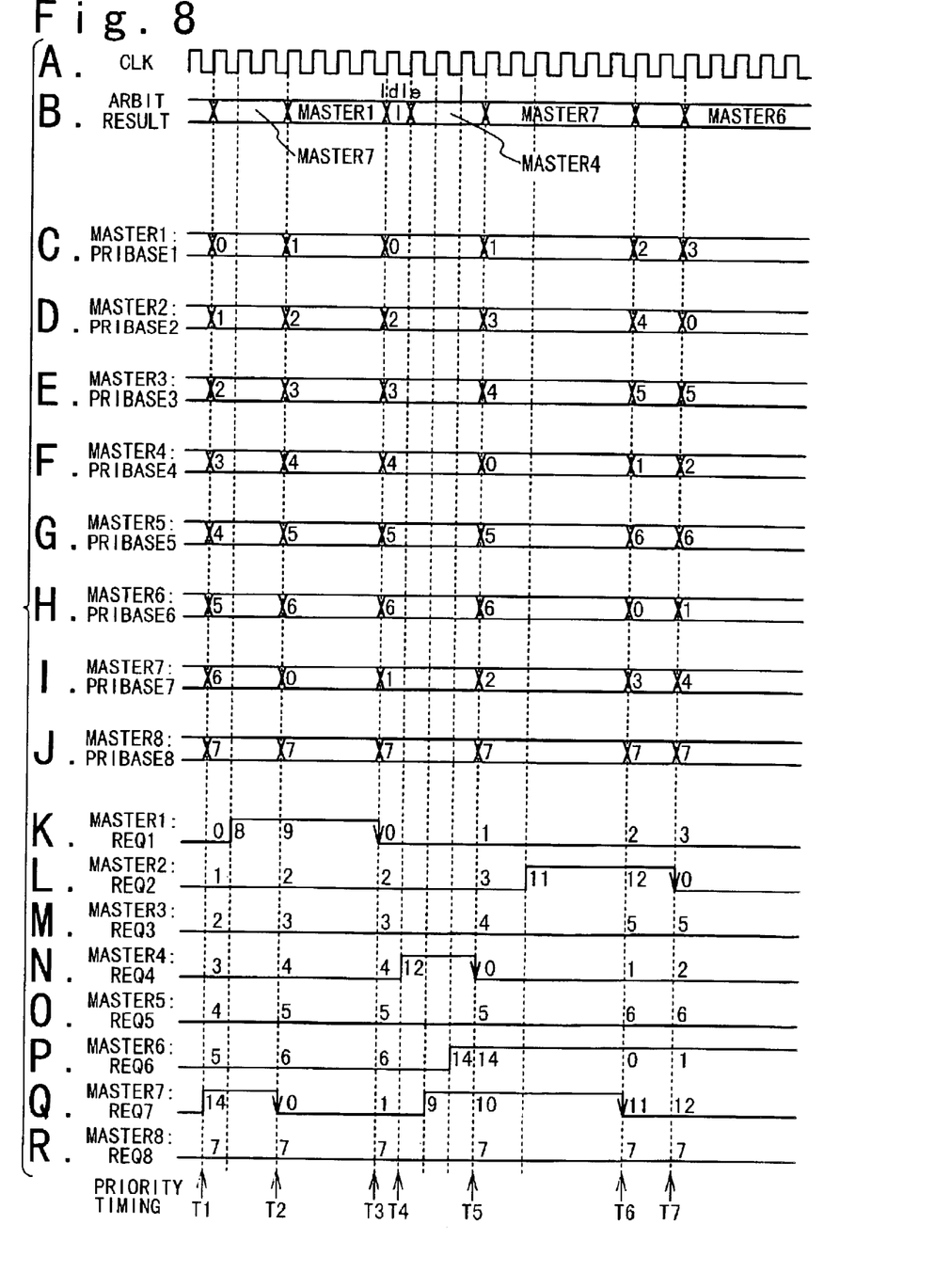
FIG. 8 is a timing chart showing another example of the operation of the bus arbiter according to the first embodiment of the present invention, when an oldest master priority method is adopted.

Hereinafter, the operation of the bus arbiter using the oldest bus acquiring master priority system will be described with reference to the timing chart shown in FIG. 8 as another example.

In the first comparing timing T1, as shown in FIGS. 8C to 8J, the basis priority data 0 to 7 are allocated to the masters 1 to 8, respectively. Moreover, it is supposed that the bus access request REQ7 of the master 7 exists as shown in FIGS. 8K to 8R. In this case, the arbitration priority data PRIINFO7 corresponding to the master 7 is "14" and is the highest. Therefore, the arbitration result is achieved to allocate the bus usage right to the master 7, as shown in FIG. 8B.

Next, as shown in FIGS. 8K to 8R, when the bus access request REQ1 is issued from the master 1 after a little time period from the first comparing timing T1, the arbitration priority data PRIINFO1 becomes "8". The arbitration priority data PRIINFO1 is incremented to "9" at the comparing timing T2. On the other hand, the arbitration priority data PRIINFO7 corresponding to the master 7 having acquired the bus usage right at the last comparing timing becomes "0", which is a minimum basic priority data, at the comparing timing T2. That is, the basic priority data of the master having acquired the bus usage right at the last comparing timing is minimized. Therefore, the arbitration priority data PRIINFO1 corresponding to the master 1 is the highest in the next comparing timing T2. Thus, the arbitration result is accomplished to allocate the bus usage right to the master 1, as shown in FIG. 8B. Hereinafter, the arbitration operation progresses in the same way in the operation flow.

According to the bus arbiter using the oldest bus acquiring master priority system, the basic priority data immediately after having acquired the bus usage right becomes the minimum value of "0". It is possible to avoid that only the specific master is advantage in competition.

On the other hand, a system exists in which continuous acquisition of the bus usage right by the master is necessary in such a case as a target retry occurs in a PCI local bus. In case of such a system, the basic priority data with the highest value of "7" is continuously or fixedly in half allocated to the master having acquired the bus usage right, and the basic priority data is returned to "0" later, if necessary. The bus arbiter according to the embodiment can be applied to such a system.

(3) Basic Priority Fixed System

The bus arbiter adopts "the basic priority fixed system" in which fixed basic priority data are always allocated to all the masters at the priority comparison timings. Hereinafter, the operation of the bus arbiter using the basic priority fixed system will be described with reference to the timing chart shown in FIG. 9 as another example.

At the first comparing timing T1, as shown in FIGS. 9C to 9J, the basis priority data 0 to 7 are given to the masters 1 to 8, respectively. Moreover, it is supposed that the bus access request REQ7 of the master 7 exists as shown in FIGS. 9K to 9R. In this case, the arbitration priority data PRIINFO7 corresponding to the master 7 is "14" and is the highest. Therefore, the arbitration result is achieved to allocate the bus usage right to the master 7, as shown in FIG. 9B.

Next, as shown in FIGS. 9K to 9R, when the bus access request REQ1 is issued from the master 1 after a little time period from the first comparing timing T1, the arbitration priority data PRIINFO1 becomes "8". The arbitration priority data PRIINFO1 is maintained as "8" at the next comparing timing T2. On the other hand, the arbitration priority data PRIINFO7 corresponding to the master 7 is returned to "6" at the comparing timing T2. That is, even if it is the master having acquired the bus usage right at the last comparing timing, the basic priority data does not change. Because the arbitration priority data PRIINFO1 of the master 1 is the largest at the comparing timing T2, the bus usage right is allocated to the master 1 as the result of the arbitration, as shown in FIG. 9B. Hereinafter, the arbitration operation progresses in the same way in the operation flow.

Figure 9:
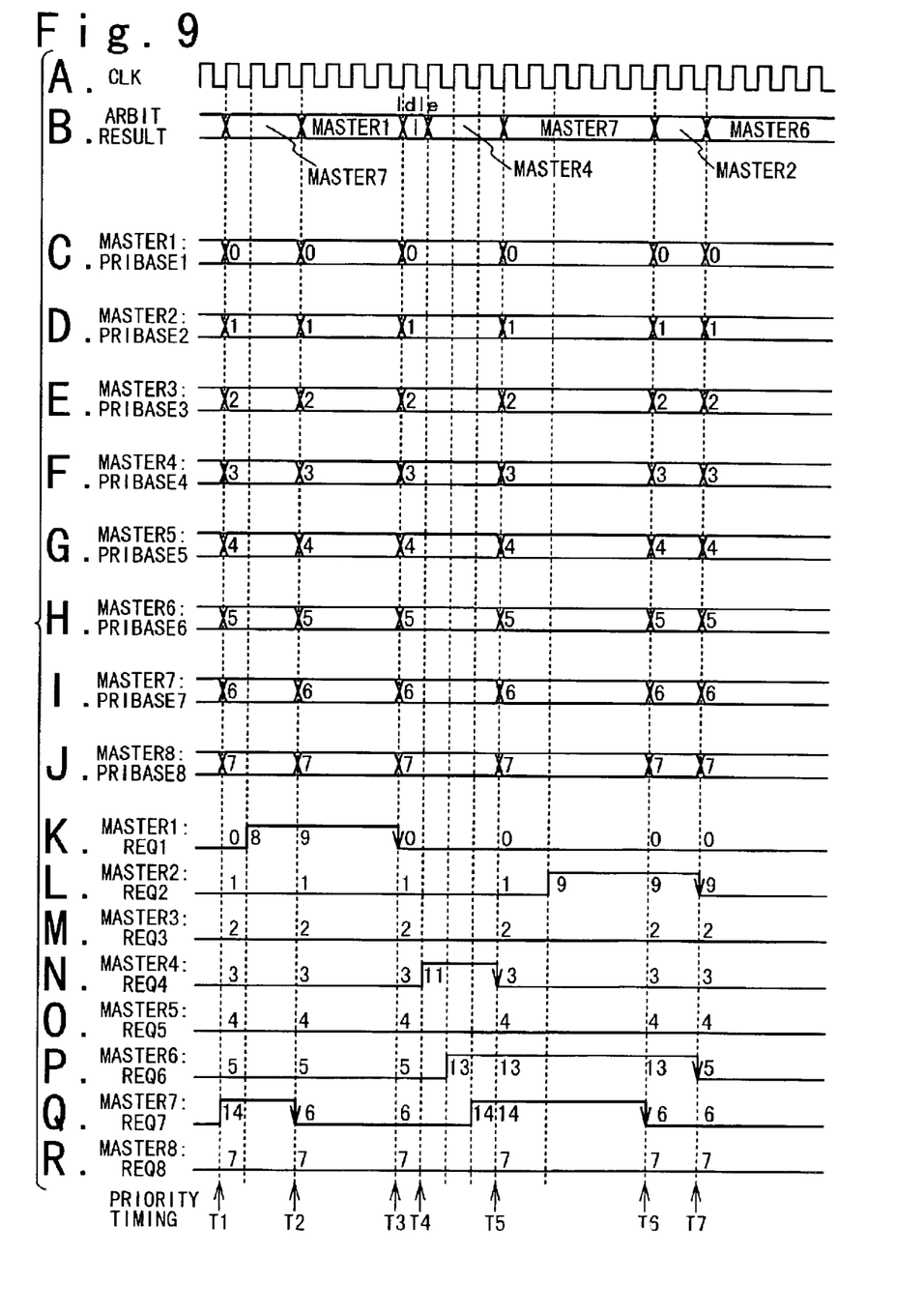
FIG. 9 is a timing chart showing another example of the operation of the bus arbiter according to the first embodiment of the present invention, when a basic priority fixing method is adopted.

According to the bus arbiter using the basic priority fixed system, the arbitration priority data of the masters are always determined regardless of the frequency and state of the acquisition of the bus usage right. Therefore, the structure of the bus arbiter is simple, compared with the other systems.

(4) The Basic Priority Half Fixed System

The bus arbiter adopts "the basic priority half fixed system", in which the basic priority fixed system, and one of the above-mentioned systems, in which the basic priority data, are changed are combined to determine the basic priority data for every master.

Figure 10:
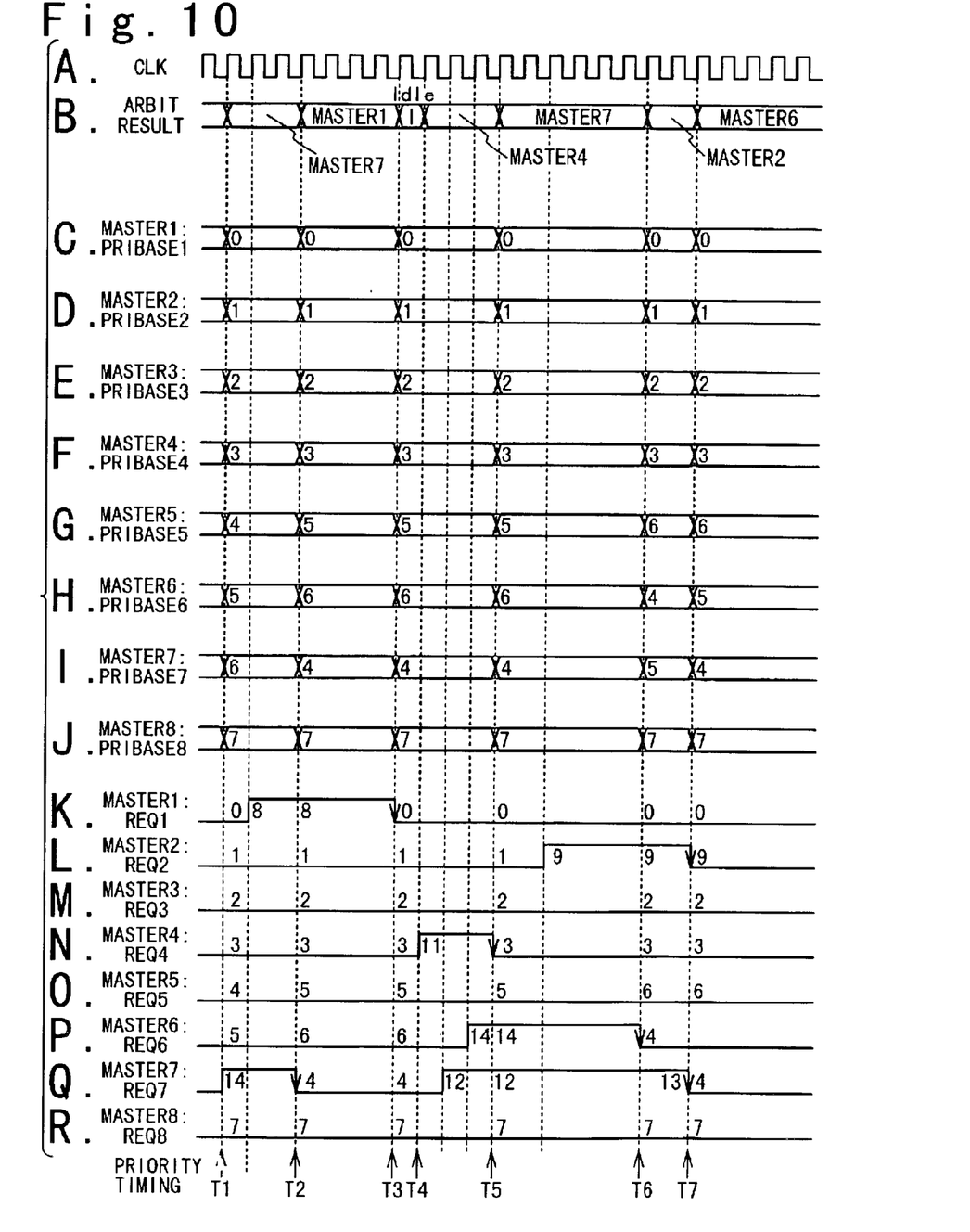
FIG. 10 is a timing chart showing another example of the operation of the bus arbiter according to the embodiment of the present invention, when a basic priority half fixed system is adopted.

Hereinafter, the operation of the bus arbiter using the basic priority half fixed system will be described with reference to the timing chart shown in FIG. 10 as another example. It should be noted that in FIG. 10, it is supposed that the basic priority fixed system is adopted for the masters 1 to 4, and the oldest bus acquiring master priority system is adopted for the masters 5 to 8 in a range of 4 to 7 in the basic priority data.

In the first comparing timing T1, as shown in FIGS. 10C to 10J, the basis priorities 0 to 7 are allocated to the masters 1 to 8, respectively. Moreover, it is supposed that the bus access request REQ7 of the master 7 exists as shown in FIGS. 10K to 10R. In this case, the arbitration priority data PRIINFO7 corresponding to the master 7 is "14" and is the highest. Therefore, the arbitration result is achieved to give the master 7 the bus usage right, as shown in FIG. 10B.

Next, as shown in FIGS. 10K to 10R, when the bus access request REQ1 is issued from the master 1 after a little time period from the first comparing timing T1, the arbitration priority data PRIINFO1 becomes "8". The arbitration priority data PRIINFO1 is maintained until the next comparing timing T2 and incremented by one to become "9". On the other hand, the arbitration priority data PRIINFO7 corresponding to the master 7 having acquired the bus usage right earlier becomes "4" which is the minimum basic priority among the masters 5 to 8. That is, the basic priority of the master having acquired the bus usage right at the last comparing timing is minimized among the masters 5 to 8. In the next comparing timing T2, because the arbitration priority data PRIINFO1 corresponding to the master 1 is the highest, the bus usage right is allocated to the master 1 as the result of the arbitration, as shown in FIG. 10B. At the next comparing timing T3, the arbitration priority data PRIINFO1 of the master 1 having acquired the bus usage right earlier returns to "0" as a fixation value. Hereinafter, the arbitration operation progresses in the same way in the operation flow.

In case of the bus arbiter using the basic priority half fixed system, the parameter of whether the basic priority data should be changed or be fixed for every master is managed by the arbitration priority control section 50. The basic priority data is updated every comparing timing in accordance with the parameter. Also, in this case, for example, the basic priority data can be set flexibly in such a manner that the basic priority data allocated to only the master 3 is fixed or the basic priority data allocated to only the masters 5 and 6 are changed. Thus, the structure to make determine the basic priority data as according to the system requirements state can be adopted.

For the purpose of the application of the present invention to the more flexible system, the basic priority data may have a same value in the present invention. This example is different from each of the above-mentioned examples. In this case, the arbitration priority data cannot be determined uniquely through the comparison of the basic priority data and a plurality of arbitration priority data can be selected. In such a case, a section may be provided to select one of the plurality of arbitration priority data based on a parameter.

Also, as another example, the comparing timing of the arbitration priority data does not have to follow always the above-mentioned examples. The comparison may be carried out for every clock in accordance with the system requirements.

In the above-mentioned embodiments, the highest value of the basic priority or the arbitration priority is "7" and the minimum value thereof is "0". However, it is possible to set "0" to the highest priority and "7" to the lowest priority in a modification of the present invention, oppositely. In the case, the bus access request is defined as the request existence in case of "0" and the request non-existence in case of "1".

In case of the bus arbiter according to the above-mentioned embodiments, a circuit to compare the arbitration priority data needs to be added if the number of arbitration priority data increases. On the other hand, according to the structure according to the modification, the highest value is "0" and a value near "0" is always used even if the number of priorities increases. Therefore, the addition of the circuit can be made small.

Moreover, the present invention does not limit the application to the bus access arbitration. The present invention can be applied to a system in which a plurality of requests are arbitrated. For example, when there are a plurality of queues, in each of which only one is selected from among a plurality of requests, the priority to accept the request is set as the basic priority in the present invention, and the present invention can be applied.

As described above, according to the present invention, the bus arbiter can be provided to carry out the bus access arbitration in the simple structure.

What is claimed is:

1. A bus arbiter for a plurality of masters which issue bus access requests, said bus arbiter comprising:
    an arbitration priority control section for outputting basic priority data for each of the plurality of masters;
    a plurality of arbitration priority generating sections, each arbitration priority generating section corresponding with one of the plurality of masters, for combining the basic priority data for said corresponding master with request indication data indicating existence or non-existence of a bus access request from said corresponding master, to generate arbitration priority data;

an arbitration priority comparing section for comparing a plurality of the arbitration priority data for the plurality of masters with each other to determine the one of the plurality of arbitration priority data which has the highest priority, and for outputting a comparison resultant signal containing data specifying the one of the plurality of masters corresponding to the arbitration priority data with the highest priority; and an arbitration result notifying section for outputting a bus use permission signal to the master corresponding to arbitration priority data with the highest priority in response to the comparison resultant signal.

2. The bus arbiter according to claim 1, wherein each of said arbitration priority generating sections combines the request indication data for the corresponding master, as the most significant bit, with the basic priority data for the corresponding master, as the least significant bit, to generate the arbitration priority data as binary data.

3. The bus arbiter according to claim 1, wherein:
larger basic priority data indicates a higher priority, and
the request indication data is a binary 1 when the bus access request from said corresponding master is present, and is a binary 0 when the bus access request from said corresponding master is absent.

4. The bus arbiter according to claim 1, wherein:
smaller basic priority data indicates a higher priority, and
the request indication data is a binary 0 when the bus access request from said corresponding master is present, and is a binary 1 when the bus access request from said corresponding master is absent.

5. The bus arbiter according to claim 1, further comprising a monitoring section for monitoring the status of the bus to determine whether a new bus cycle can be started,
wherein each of said arbitration priority generating sections generates the arbitration priority data for the corresponding master when it is determined that a new bus cycle cannot be started and that the bus access request from the corresponding master is changed.

6. The bus arbiter according to claim 5, wherein each of said arbitration priority generating sections holds the arbitration priority data for the corresponding master when it is determined that a new bus cycle cannot be started, but that the bus access request from the corresponding master is not changed.

7. The bus arbiter according to claim 1, wherein:
said arbitration result notifying section outputs an arbitration resultant control signal to said arbitration priority control section in response to the comparison resultant signal, and
said arbitration priority control section changes the basic priority data for each of the plurality of masters based on the arbitration resultant control signal.

8. The bus arbiter according to claim 7, wherein said arbitration priority control section generates the basic priority data for each of the plurality of masters such that the basic priority data is circulated from a predetermined priority based on a defined method.

9. The bus arbiter according to claim 7, wherein said arbitration priority control section generates the basic priority data for each of the plurality of masters such that the lowest priority is allocated to the master which received the bus use permission signal in a previous cycle, and increased basic priority data is allocated to each of the plurality of masters other than the master which received the bus use permission signal in the previous cycle.

10. The bus arbiter according to claim 7, wherein said arbitration priority control section generates the basic priority data for each of the plurality of masters such that fixed basic priority data are always allocated to each of the plurality of masters, and the fixed basic priority data is allocated to the master which received the bus use permission signal in a previous cycle.

11. The bus arbiter according to claim 7, wherein said arbitration priority control section generates the basic priority data for each of a plurality of the plurality of masters such that the basic priority data is circulated from a predetermined priority based on a defined method.

12. The bus arbiter according to claim 7, wherein said arbitration priority control section generates the basic priority data for each of a plurality of said plurality of masters, such that the lowest priority is allocated to the master which received the bus use permission signal in a previous cycle, and increased basic priority data is allocated to each of a plurality of said plurality of masters other than the master which received the bus use permission signal in the previous cycle.

13. The bus arbiter according to claim 7, wherein said arbitration priority control section generates the basic priority data for each of a plurality of said plurality of masters such that fixed basic priority data are always allocated to each of the plurality of said plurality of masters, and the fixed basic priority data is allocated to the master which received the bus use permission signal in a previous cycle.

14. A bus access control method for a plurality of masters which issue bus access requests, said method comprising:
generating basic priority data for each of the plurality of masters;
combining the basic priority data corresponding to each master with request indication data indicating existence or non-existence of a bus access request from the corresponding master, to generate arbitration priority data;
comparing a plurality of the arbitration priority data for the plurality of masters with each other to determine the one of the plurality of arbitration priority data which has the highest priority; and
allocating a bus usage right to the master corresponding to the one of the arbitration priority data with the highest priority.

15. The bus access control method according to claim 14, wherein combining the basic priority data with the request indication data comprises combining the request indication data for corresponding master with the basic priority data for the corresponding master as the most significant bit, to generate the arbitration priority data as binary data.

16. The bus access control method according to claim 15, wherein:
larger basic priority data indicates a higher priority, and
the request indication data is a binary 1 when the bus access request from the corresponding master is present, and is a binary 0 when the bus access request from the corresponding master is absent.

17. The bus access control method according to claim 15, wherein:
a smaller basic priority data indicates a higher priority, and
the request indication data is a binary 0 when the bus access request from the corresponding master is present, and is a binary 1 when the bus access request from the corresponding master is absent.

18. The bus access control method according to claim 14, further comprising monitoring the status of the bus to determine whether a new bus cycle can be started, wherein combining the basic priority data with the request indication data comprises generating the arbitration priority data for the corresponding master when it is determined that a new bus cycle cannot be started and the bus access request from the corresponding master is changed.

19. The bus access control method according to claim 14, wherein generating the basic priority data comprises changing the basic priority data for each of the plurality of masters based on the allocation of the bus usage right to the corresponding master with the highest priority.

20. A bus access control system for a plurality of masters which issue bus access requests, said system comprising:

means for generating basic priority data for each of the plurality of masters;

means for combining the basic priority data corresponding to each master with request indication data indicating existence or non-existence of a bus access request from the corresponding master, to generate arbitration priority data;

means for comparing a plurality of the arbitration priority data for the plurality of masters with each other to determine the one of the plurality of arbitration priority data which has the highest priority; and means for allocating a bus usage right to the master corresponding to the one of the arbitration priority data with the highest priority.

* * * * *